United States Patent
Zaima et al.

(10) Patent No.: US 7,119,288 B2
(45) Date of Patent: Oct. 10, 2006

(54) METHOD AND APPARATUS FOR WEIGHING EASILY CHARGEABLE MEASURED OBJECT

(75) Inventors: Yasuhiro Zaima, Iwakuni (JP); Masahiko Dohi, Tokyo (JP); Seiji Mochizuki, Iwakuni (JP); Akemi Kitada, Syunan (JP)

(73) Assignee: Teijin Limited, Osaka (JP)

( * ) Notice: Subject to any disclaimer, the term of this patent is extended or adjusted under 35 U.S.C. 154(b) by 41 days.

(21) Appl. No.: 10/489,677

(22) PCT Filed: Jul. 17, 2003

(86) PCT No.: PCT/JP03/09112

§ 371 (c)(1),
(2), (4) Date: Mar. 16, 2004

(87) PCT Pub. No.: WO2004/008088

PCT Pub. Date: Jan. 22, 2004

(65) Prior Publication Data

US 2005/0123021 A1   Jun. 9, 2005

(30) Foreign Application Priority Data

Jul. 17, 2002   (JP) .............................. 2002-208312

(51) Int. Cl.
*G01G 13/00* (2006.01)
*G01G 23/00* (2006.01)

(52) U.S. Cl. ...................................... 177/180; 177/238

(58) Field of Classification Search ........ 177/180–181, 177/238–244
See application file for complete search history.

(56) References Cited

U.S. PATENT DOCUMENTS

| 4,821,821 A | 4/1989 | Kelly ........................ 177/180 |
| 5,869,788 A * | 2/1999 | Gordon et al. ............... 177/124 |
| 6,515,238 B1 * | 2/2003 | Martens et al. ............. 177/180 |
| 6,965,083 B1 * | 11/2005 | Reiser ........................ 177/238 |

FOREIGN PATENT DOCUMENTS

| JP | 1-40015 Y2 | 12/1989 |
| JP | 2-51027 A | 2/1990 |
| JP | 4-32028 U | 3/1992 |
| JP | 10253436 A | 9/1998 |
| JP | 2000131132 A | 5/2000 |

* cited by examiner

*Primary Examiner*—Randy W. Gibson
(74) *Attorney, Agent, or Firm*—Sughrue Mion, PLLC

(57) ABSTRACT

A method of weighing an easily chargeable measured object able to remove the effects of static electricity to weigh a measured object by an accuracy of about 0.3 mg continuously with a good work efficiency. When using an electronic scale (10) provided with a weighing platform (11) and a weighing pan (12) able to move vertically by a very small distance with respect to the weighing platform to weight an easily chargeable measured object (14), the measured object is weighed in the state with a conductive frame (13) of a suitable size set on the weighing platform (11) around the weighing pan so as to surround the measured object placed on the weighing pan.

8 Claims, 1 Drawing Sheet

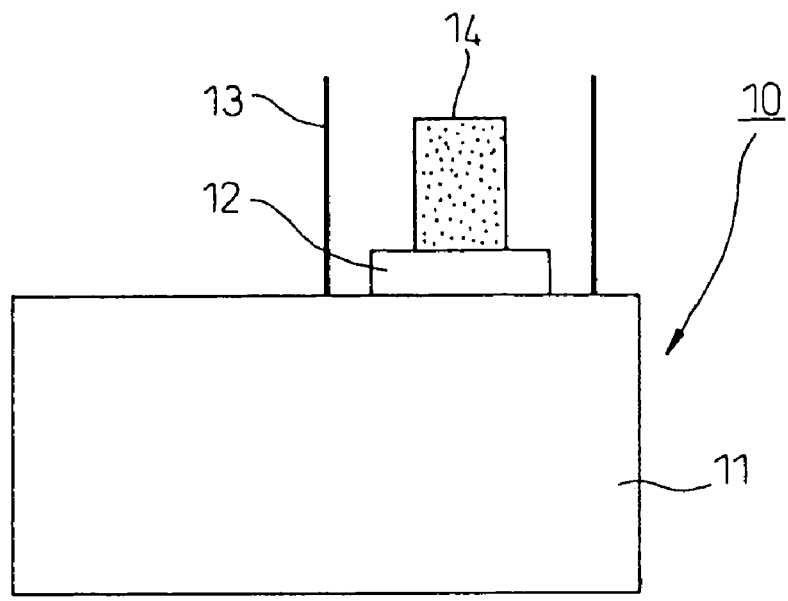
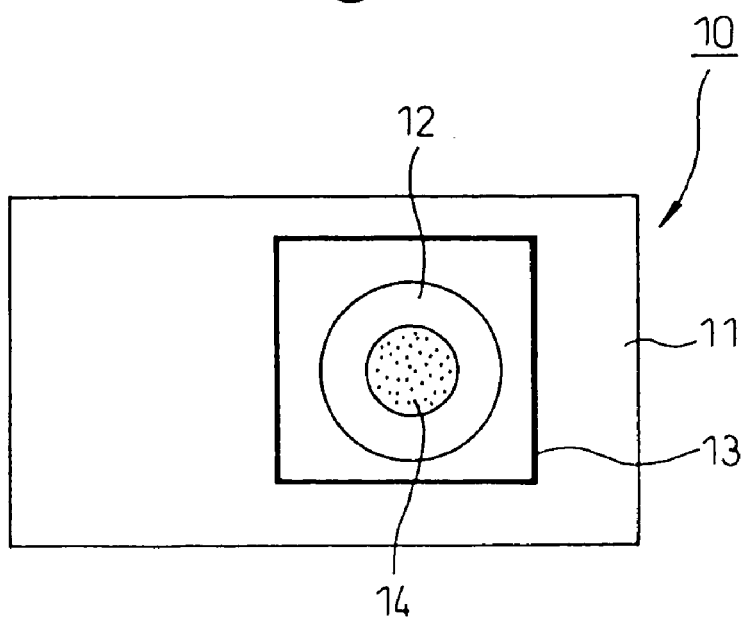

METHOD AND APPARATUS FOR WEIGHING EASILY CHARGEABLE MEASURED OBJECT

TECHNICAL FIELD

The present invention relates to a method for measuring the weight or mass of an easily chargeable measured object, for example, any chargeable container or a chargeable container in which a powder or liquid is filled.

BACKGROUND ART

In the past, when measuring a weight with an accuracy of about 0.3 mg, it has been a practice to set an electronic scale in a wind-shielding box to weigh the object.

However, when weighing a very small amount with a good accuracy in a production line of a drug etc., changes in temperature, wind, vibration, magnetic lines of force generated from the control equipment, static electricity, etc. cause a detrimental effect on the measurement accuracy of the electronic scale. Among these, the detrimental effects due to static electricity are extremely hard to prevent or eliminate.

As an apparatus for preventing or removing static electricity, there are known anti-static rods, anti-static brushes, static electricity ion generators, etc. for causing static electricity produced to be discharged to the ground. Further, the method of using a conductive film, conductive coating, etc. to form an electrodischarge circuit is also known. Here, the inventors of this case tried applying these means to a weighing apparatus or devising an effective method of application of these means, but could not achieve an accuracy of about 0.3 mg.

On the other hand, the method of covering a measured object on a weighing pan by a cap made of a conductor so as to cut the electric field between the measured object and outside is also known.

For example, Japanese Examined Patent Publication (Kokoku) No. 8-1394 or Japanese Patent No. 2612905 discloses to prevent the detrimental effect of static electricity when weighing a vial, ampoule, or other drug container by an electronic scale in a process for production of a drug by covering the measured object with a cap made of a conductor.

The inventors of the present case tried applying this method as well, but found that an electrical interaction occurred between the measured object and the conductor cap and were not able to achieve an accuracy of about 0.3 mg in the same way as other conventional methods. Further, they learned that there are the problems that an operation for covering each measured object with a cap at the time of weighing is required, that this is poor in work efficiency and becomes an obstacle in raising the speed of the production line, and that the apparatus as a whole also has to become complicated in mechanism.

Further, as other prior art, Japanese Unexamined Patent Publication (Kokai) No. 4-13933 discloses a scale with a leveler wherein a shield plate is attached to the mechanism of the scale near to the leveler so as to prevent static electricity from having an effect on the leveler.

According to the above-mentioned prior art, when weighing an easily chargeable measured object, it was not possible to eliminate the effects due to static electricity and achieve an accuracy of 0.3 mg so. Further, in the process of production of a drug etc., it was difficult to continuously weigh any chargeable containers or a chargeable container in which powdered or liquid medicines are filled with a good work efficiency.

DISCLOSURE OF INVENTION

The present invention was made in consideration of the above background and has as its object the provision of method and apparatus for weighing an easily chargeable measured object which can remove the effects of static electricity so as to enable continuous weighing of a measured object with a good work efficiency by an accuracy of about 0.3 mg.

To achieve the above object, according to the present invention, there is provided an apparatus for weighing an easily chargeable measured object characterized by being provided with a weighing platform, a weighing pan placed on a top surface of the weighing platform and able to move vertically by a very small distance with respect to the weighing platform, a conductive frame placed on the weighing platform around the weighing pan so as to be able to surround a measured object to be placed on the weighing pan, and a means for successively and continuously moving measured objects to the weighing pan and taking them off the weighing pan. There is provided a method of weighing an easily chargeable measured object characterized by weighing an easily chargeable measured object using a weighing apparatus provided with a weighing platform and a weighing pan placed on a top surface of the weighing platform and able to move vertically by a very small distance with respect to the weighing platform and, at that time, weighing the measured object in a state with a conductive frame placed on the weighing platform around the weighing pan so as to surround a measured object placed on the weighing pan.

In the present invention, by placing the frame comprised of the conductor, the electric field between the measured object and outside is substantially cut. Further, by adjusting the shape of the frame, it is possible to cancel out the residual static electricity between the measured object and outside and the static electricity between the measured object and scale body by the static electricity acting between the measured object and frame so as to achieve equilibrium and thereby remove the static electricity acting on the measured object to achieve precision weighing. Note that in the present description, "precision weighing" means weighing requiring an accuracy of about 0.3 mg.

The weighing apparatus is characterized by use of an electronic scale. Further, it is characterized by weighing as an easily chargeable measured object a chargeable container or a chargeable container in which a powder or a liquid is filled.

In particular, the present invention weighs as an easily chargeable measured object a multidose dispenser inside of which multidoses worth of a powdered medicine are filled and having a means for discharging a single dose worth of a predetermined amount of powdered medicine for each operation and, in a process of production and inspection of the multidose dispenser, finds weights and a weight difference of the multidose dispenser before and after spraying an initial single dose worth of powdered medicine.

It is further characterized in that the conductive frame is placed around a weighing pan in advance before placing the measured object on the weighing pan and in that measured objects are placed on and taken off from the weighing pan successively and continuously. Due to this, for example, it is possible to obtain a method of weighing suitable for continuously weighing very small amounts on for example a production line for drugs etc.

Further, according to the present invention, there is provided an apparatus for weighing an easily chargeable measured object characterized by being provided with a weighing platform, a weighing pan placed on a top surface of the weighing platform and able to move vertically by a very small distance with respect to the weighing platform, a conductive frame placed on the weighing platform around the weighing pan so as to be able to surround a measured object to be placed on the weighing pan, and a means for successively and continuously moving measured objects to the weighing pan and taking them off the weighing pan. There is provided a weighing apparatus for an easily chargeable measured object characterized by being provided with a weighing pan able to move vertically by a very small distance with respect to the weighing platform and a conductive frame placed on the weighing platform around the weighing pan so as to be able to surround a measured object to be placed on the weighing pan. In this case, the conductive frame may be not only a frame made of a metal or other conductor, but also a nonmetallic frame comprised of a plastic or other nonconductor frame coated with a conductive substance.

Further, according to the present invention, there is provided an apparatus for weighing an easily chargeable measured object characterized by being provided with a weighing platform, a weighing pan placed on a top surface of the weighing platform and able to move vertically by a very small distance with respect to the weighing platform, a conductive frame placed on the weighing platform around the weighing pan so as to be able to surround a measured object to be placed on the weighing pan, and a means for successively and continuously moving measured objects to the weighing pan and taking them off the weighing pan.

BRIEF DESCRIPTION OF DRAWINGS

FIG. 1 is a schematic side view of a weighing apparatus of the present invention; and FIG. 2 is a schematic plan view of a weighing apparatus of the present invention shown in FIG. 1.

BEST MODE FOR CARRYING OUT THE INVENTION

Below, an embodiment of the present invention will be explained in detail with reference to the attached drawings.

FIG. 1 and FIG. 2 are a schematic side view and plan view of a weighing apparatus of the present invention.

In the embodiment of the present invention, as the weighing apparatus, an electronic scale 10 is used. The electronic scale 10 is one which measures the weight of a measured object 14 by placing on the top surface of a weighing platform 11 a weighing pan 12 able to be moved vertically a very small distance with respect to the weighing platform 11, placing the measured object 14 on it, and lowering the weighing pan 12 a very small distance by the principle of a scale in accordance with the weight or mass of the measured object 14 so as to measure the weight of the measured object 14.

In the present invention, when weighing an easily chargeable measured object 14, a suitably shaped frame 13 with conductivity is placed on the weighing platform 11 around the weighing pan 12 so as to surround the measured object 14 placed on the weighing pan. The frame 13 is of a size greater than the diameter of the weighing pan 12 having a circular planar shape and is not sticking out from the weighing platform 11. For example, the frame 13, as illustrated, has a square planar shape and includes a frame made of a metal or another conductor, or a frame made of nonmetallic material, such as, plastic coated with a conductive substance. Further, the height of the frame 13 is made an extent completely covering the measured object 14 in the state with the measured object 14 placed on the weighing pan 12 and of an extent not interfering with the insertion and removal of the measured object 14 to and from the weighing pan 12.

Easily chargeable measured objects 14 include containers with conductivity or containers with conductivity in which a powder or liquid is filled, for example, a container used as a multidose dispenser in which a large number of doses worth of a powdered medicine is filled and having a means for discharging a single dose worth of a predetermined amount of the powdered medicine for each operation.

This type of container (measured object) 14 is an approximately 8 g plastic container supplied from a production line and is placed on the weighing pan 12 of the electronic scale 10 using a robot arm (not shown). The electronic scale 10 is placed on a vibration-proof platform (not shown), is surrounded by a wind-shielding cover (not shown), and does not have any other control equipment etc. placed near the electronic scale 10 so as to prevent detrimental effect on weighing due to vibration, wind, or magnetic lines of force.

After placing a container 14 on the weighing pan 12, the robot arm (not shown) is moved away from the electronic scale 10 to prevent interaction with the container 14. After the indicator value of the electronic scale 10 stabilizes, this indicator value is output to a sequencer (not shown), quality is judged by whether the measured weight is in a predetermined range, passing containers are sent on to the next stage of the production line, and failing containers are sent to a failed container discharge line by the robot arm (not shown). Note that the weighed value of each container is output to a computer (not shown).

EXAMPLES

We used the apparatus shown in FIGS. 1 and 2 to conduct comparative experiments for the case of setting a metal frame 13 around the weighing pan 12 of the electronic scale 10 and the case of not setting it. The metal frame 13 used was one of 90 mm×90 mm×90 mm(H). The experiments were conducted under a low moisture environment (30 to 40% RH) where static electricity easily is generated. Containers not charged and containers forcibly charged by rubbing were used for weighing several hundred times. The amount of static electricity was measured using a KSD-0103 type surface potentiometer made by KSD Co. The electronic scale used was a Model AD-4212 made by A&D. The results of measurement are shown in Table 1.

TABLE 1

| Experiment no. | Metal frame | Amount of charging (kV) | Weighing error (mg) |
| --- | --- | --- | --- |
| 1 | None | 0 to −0.2 | 0 to ±0.3 |
| 2 |  | −5 to −6 | 3 to 4 |
| 3 | Yes | 0 to −0.2 | 0 to ±0.3 |
| 4 |  | −2 to −3 | 0 to ±0.3 |
| 5 |  | −5 to −6 | 0 to ±0.3 |

From the results of Experiment No. 1, it is learned that if the container 14 is not charged, accurate weighing is possible even without placing the metal frame 13. However, from the results of Experiment No. 2, it is learned that if the container is charged when the metal frame is not set, the weighing accuracy falls remarkably. On the other hand, from the results of Experiment Nos. 3, 4, and 5, it is learned that by setting the metal frame 13, accurate weighing is possible regardless of charging of the container 14 or the degree of charging and that the drop in the weighing accuracy due to static electricity is greatly suppressed due to the metal frame 13 being set. Note that the measurement time per container of the measured objects when setting the metal frame 13 is 1.6 second, that is, weighing is possible in an extremely short time.

Next, comparative examples will be explained.

Comparative Example 1

The shape of the metal frame 13 was changed and similar experiments were conducted. The metal frames used were ones somewhat lower in height than the metal frame of the example of the invention of 90 mm×90 mm×70 mm(H) and one where the top surface of the metal frame was covered by a metal plate to an extent not interfering with movement of the containers (shape similar to metal cap). The results are shown in Table 2.

TABLE 2

| Experiment No. | Frame | Amount of charging (kV) | Weighing error (mg) |
| --- | --- | --- | --- |
| 6 | 90 mm × 90 mm × 70 mm (H) | 0 to −0.2 | 0 to ±0.3 |
| 7 | | −2 to −3 | 0.5 to 1 |
| 8 | | −5 to −6 | 2 to 3 |
| 9 | Top surface covered by metal plate | −5 to −6 | −4 to −5 |

From the results of Experiment Nos. 6, 7, and 8, it is learned that if the height of the metal frame 13 is changed, that is, the height is lowered, the effect of suppression of the drop in weighing accuracy due to charging is remarkably reduced. Further, from the results of Experiment No. 9, it is learned that if covering the top surface of the metal frame by a metal plate and making it a shape similar to a metal cap, the metal plate at the top surface and the containers interact (pull at each other) and the weighing accuracy remarkably drops. From these results, it is learned that the shape of the metal frame 13 has a large effect on the weighing accuracy, so it is important to set a metal frame 13 of a suitable shape and cancel out and balance the attraction due to charged container 14 and the static electricity acting on the scale body.

Comparative Example 2

The shape of the metal frame 13 was changed and similar experiments were conducted. The frames used were one changed in material to paper, that is, a material with a low conductivity, and one comprised of paper coated with a conductive substance. The size of the frame was made 90 mm×90 mm×90 mm(H). The results are shown in Table 3.

TABLE 3

| Experiment No. | Frame | Amount of charging (kV) | Weighing error (mg) |
| --- | --- | --- | --- |
| 10 | Paper | −5 to −6 | 0.5 to 1 |
| 11 | Paper coated with conductive substance | −5 to −6 | 0 to ±0.3 |

From the results of Experiment No. 10, it was learned that the results of suppression of the drop in weighing accuracy due to static electricity were weaker with a material with a low conductivity like paper. On the other hand, from the results of Experiment No. 11, it was learned that similar effects were obtained as with a metal frame even with a material with a low conductivity coated with a conductive substance.

Comparative Example 3

We also studied the method of setting the metal frame on the weighing pan 12 instead of the weighing platform 11 of the electronic scale. We set a metal frame of a size not interfering with movement of the containers 14 and a height of 90 mm on the weighing pan 12 for carrying the container 13 and conducted a similar experiment. The results are shown in Table 4.

TABLE 4

| Experiment No. | Frame | Amount of charging (kV) | Weighing error (mg) |
| --- | --- | --- | --- |
| 12 | Set on weighing pan | −5 to −6 | 0 to ±1 |

From the results of Experiment No. 12, while there was an effect of suppression of the drop in weighing accuracy due to static electricity, it was necessary to make the weighing pan 12 larger, so this became more susceptible to wind and a weighing accuracy of an extent of placement of a metal frame 13 on the weighing platform 11 around the weighing pan 12 could not be obtained. To mitigate the effects of wind, we also tried the improvement of making the metal frame a mesh shape etc., but the weighing accuracy could only be improved to 0 to ±0.5 mg or so. From this, it was learned that it is necessary to place the metal frame 13 on the weighing platform 11 around the weighing pan 12.

Note that the sizes of the containers used as measured objects in the above example and comparative examples had diameters of 2.5 cm and heights of 5.8 cm. Regarding the weight ratio of the packaging of each container and the drug, the container as a whole including the drug weighed about 8.8 g and the drug inside weighed 1.2 g, so the packaging of each container weighed about 7.6 g. Therefore, the weight ratio was 7.6:1.2.

While the present invention was explained above for embodiments and examples, the present invention is not limited to these embodiments and examples. Various forms, modifications, corrections, etc. within the spirit or scope of the present invention are possible. For example, in the above, the metal frame 13 was shown as having a square plan shape, but it is also possible to use a circular one similar to the planar shape of the weighing pan 12.

INDUSTRIAL APPLICABILITY

As clear from the above explanation, according to the present invention, it is possible to measure a weight of an easily chargeable container, considered difficult in the past, by a high accuracy of not more than 0.3 mg and an extremely short measurement time of 1.6 second. This becomes an extremely effective means in control of the amount filled when filling a small amount of powder in a container at a production line etc. of a drug or in control of a fine amount of sprayed weight of an inhalant etc. Further, the mechanism is extremely simple and incorporation into production lines is easy, so the practicality is extremely high.

The invention claimed is:

1. A method of weighing an easily chargeable measured object characterized by weighing an easily chargeable measured object using a weighing apparatus provided with a weighing platform and a weighing pan placed on a top surface of said weighing platform and able to move vertically by a very small distance with respect to said weighing platform and, at that time, weighing said measured object in a state with a conductive frame placed on said weighing platform around said weighing pan so as to surround a measured object to be placed on said weighing pan, wherein no lid is provided for covering a top of the conductive frame.

2. A weighing method as set forth in claim 1, characterized by using an electronic scale as a weighing apparatus.

3. A weighing method as set forth in claim 1, characterized by weighing as an easily chargeable measured object any chargeable container or a chargeable container in which a powder or a liquid is filled.

4. A weighing method as set forth in claim 3, characterized by weighing as an easily chargeable measured object a multidose dispenser inside of which multidoses worth of a powdered medicine are filled and having a means for discharging a single dose worth of a predetermined amount of powdered medicine for each operation and, in a process of production and inspection of said multidose dispenser, finding weights and a weight difference of said multidose dispenser before and after spraying an initial single dose worth of powdered medicine.

5. A weighing method as set forth in claim 1, characterized in that a conductive frame is placed around a weighing pan in advance before placing the measured object on said weighing pan and in that measured objects are placed on and taken off from said weighing pan successively and continuously.

6. An apparatus for weighing an easily chargeable measured object characterized by being provided with a weighing platform, a weighing pan placed on a top surface of said weighing platform and able to move vertically by a very small distance with respect to said weighing platform, and a conductive frame placed on said weighing platform around said weighing pan so as to be able to surround a measured object to be placed on said weighing pan, wherein no lid is provided for covering a top of the conductive frame.

7. A weighing apparatus as set forth in claim 6, characterized in that said conductive frame is a metal frame or a nonmetallic frame coated with a conductive substance.

8. An apparatus for weighing an easily chargeable measured object characterized by being provided with a weighing platform, a weighing pan placed on a top surface of said weighing platform and able to move vertically by a very small distance with respect to said weighing platform, a conductive frame placed on said weighing platform around said weighing pan so as to be able to surround a measured object to be placed on said weighing pan, and a means for successively and continuously moving measured objects to said weighing pan and taking them off said weighing pan, wherein no lid is provided for covering a top of the conductive frame.

* * * * *